C. HEMJE.
CENTER-BOARD VESSEL.
No. 7,044. Reissued April 11, 1876.
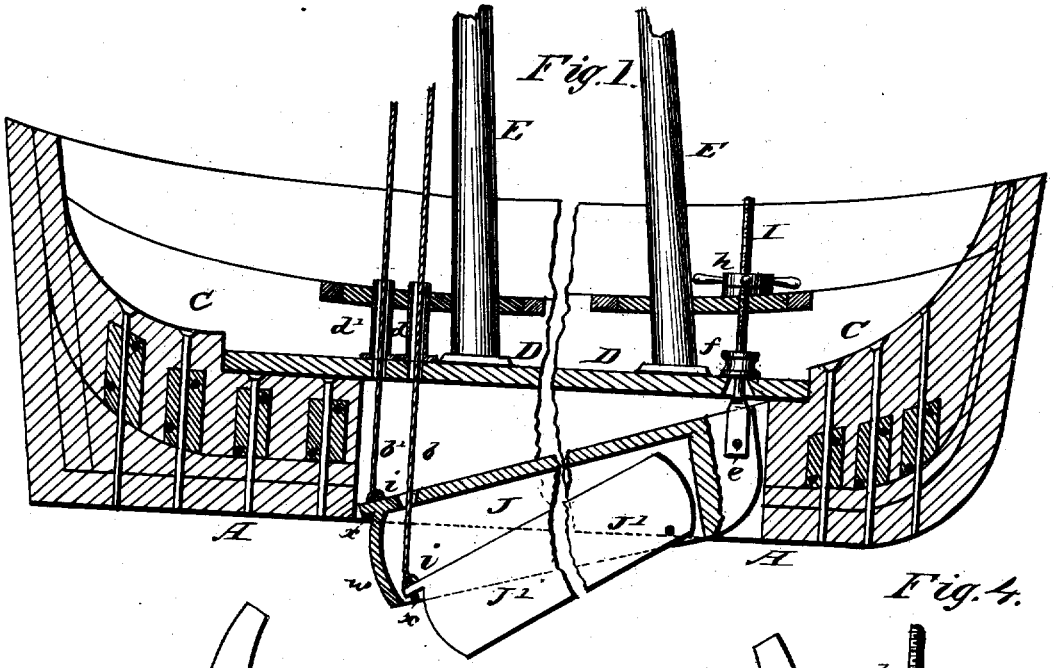
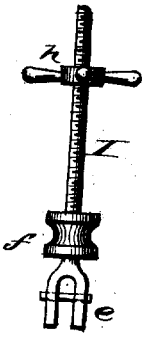
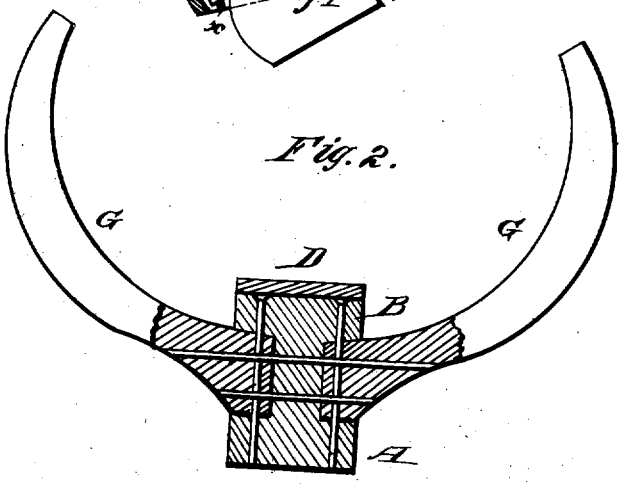
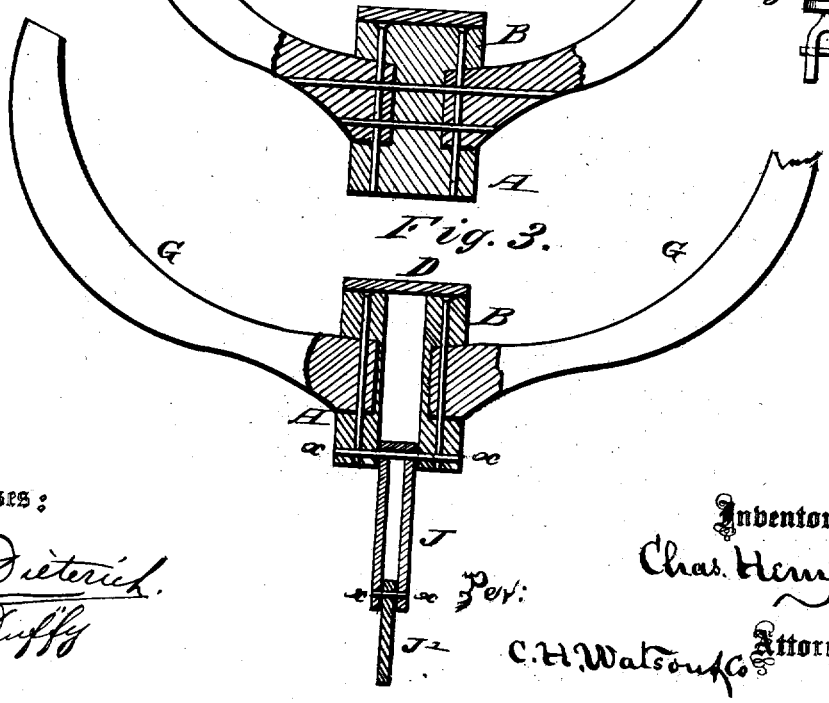
Witnesses:
P. C. Dieterich.
F. H. Duffy
Per:
C. H. Watson & Co.
Inventor:
Chas. Hemje
Attorneys.
N. PETERS, PHOTO-LITHOGRAPHER, WASHINGTON, D. C.

UNITED STATES PATENT OFFICE.

CHARLES HEMJE, OF NEW YORK, N. Y.

IMPROVEMENT IN CENTER-BOARD VESSELS.

Specification forming part of Letters Patent No. 158,708, dated January 12, 1875; reissue No. 7,044, dated April 11, 1876; application filed March 14, 1876.

*To all whom it may concern:*

Be it known that I, CHARLES HEMJE, of New York city, in the county of New York and State of New York, have invented certain new and useful Improvements in Center-Board Vessels; and I do hereby declare that the following is a full, clear, and exact description thereof that will enable others skilled in the art to which it appertains to make and use the same, reference being had to the accompanying drawings, and to the letters of reference marked thereon, which form a part of this specification.

My invention relates to that class of vessels which have one or more center-boards to be lowered from the keel; and it has for its object to render such vessels stronger and more durable.

In vessels of this class, as heretofore constructed, the center-board is located between the masts, and hence the center of gravity of the center-board comes too far forward, whereby the vessel handles heavily, and requires more or less rudder.

Now, the nature of my invention consists in a peculiar construction of the keel and keelson, which allows of the center-board running past the masts, so that its center of gravity will fall in a vertical line with the center of gravity of the vessel.

My invention also consists in two center-boards—one within the other—and so arranged as to be adjusted together or independently of each other, all as hereinafter more fully set forth.

In the annexed drawing, Figure 1 is a longitudinal vertical section of a vessel embodying my invention. Figs. 2 and 3 are transverse vertical sections of the same; and Fig. 4 is a view of the means for adjusting the front ends of the center-board.

In the building of the vessel I entirely dispense with the floor-timbers, as now used, forward and aft of the center-board trunk, and instead of the separate keel and keelson, I bolt the keel A and keelson B firmly together with no space between them, so as to form actually only one piece, as shown. The stem and stern posts C C are fastened to this piece in the ordinary manner. As far as the center-board is going to come, a slot or opening is cut longitudinally in the combined keel and keelson A B from top to bottom, and on the upper side of said combined keel and keelson is laid and fastened a heavy rider, D, to close the center-board opening toward the inside of the vessel, as well as for the heels of the masts E E to stand on. By this mode of construction the masts do not interfere with the center-board, which latter can extend both forward and aft of the masts. The frames G G are made in two halves each, the heel of each half-frame being mortised into the sides of the combined keel and keelson, and can be bolted both horizontally and vertically, as shown in the drawing.

The center-board used in this vessel is made of iron or other suitable material, and constructed in two parts, J and J′, the outside part J forming a case over the inside part J′, when the latter is hauled up, and both working in the slot or opening in the combined keel and keelson. The inner part J′ is hung at its forward end on a bolt, *a*, passing horizontally through the outside case J, and on the after end is suspended by a chain or rod, *b*, passing through openings in the upper edge of the case and of the cap D, and through a flanged column, *d*, bolted to the cap up to the deck. The outside case J is suspended at the forward end by a heavy vertical rod, I, the lower end of which is forked to receive a part of the case J into it, a horizontal bolt, *e*, connecting them. On the top of the cap D the rod I is provided with a stuffing-box, *f*, for the purpose of keeping out the water. The upper end of the rod, either above or below deck, is threaded, and provided with a screw, hand-wheel, *h*, or other mechanical device for raising or lowering, as may be necessary. At the rear end the case J is provided with a rod or chain, *b′*, passing up through a column, *d′*, the same as described for the inner part J′. The case or board J is closed at the rear end by partition *w*, so that the entire case is closed except the bottom.

By this means the center-boards J J′ may be used together or separately, as desired. When the chain or rod *b* is loosened the board J′ will turn on the bolt *a* at its forward end, and its aft end drop down until a projection, *i*, at that end strikes a stop-bolt, *x*, in the case J. When the chain or rod $b'$ is loosened the case J′ will turn on the bolt $e$ at its forward end, and its aft end drop down until stopped by similar stops $x$ $i$.

For the purpose of getting more surface of center-board the forward end can be lowered by means of the rod I, and by raising or lowering the forward end the action of the center-board can be regulated and shifted backward and forward, so as to suit the sailing qualities of the vessel.

The center of the action of the center-board should be on a vertical line with the center of gravity of the vessel to make the vessel handle easily, and as the center of gravity of the vessel is not a fixed point, depending upon the storage of the cargo, it is necessary to arrange the center-board so that its center of action may be made to correspond with the center of gravity of the vessel. This is accomplished by the adjustment of the center-board, as before described.

Having thus fully described my invention, what I claim as new, and desire to secure by Letters Patent, is—

1. In the construction of vessels, where a short and deep board is preferable, the combination of the combined keel and keelson A B, half-frames G G, and rider D, the latter for the purpose of covering the top of the center-board, substantially as specified.

2. The combination, substantially as described, of the frames G G and rider D with the combined keel and keelson A B, whereby great strength is preserved, while a full-sized center-board may be used without interfering with the position of the masts, and whereby the ordinary floor-timbers are dispensed with, substantially as and for the purpose specified.

3. In combination with a center-board, composed of two or more sections, J J′, pivoted together at or near their front ends, the rigid forward hoisting device and independent after hoisting cords or chains $b$ $b'$, substantially as and for the purpose described.

In testimony that I claim the foregoing I have hereunto set my hand this 13th day of March, 1876.

CHARLES HEMJE.

Witnesses:

HENRY L. DAVIS,
LEWIS L. PIERCE.